United States Patent
Oh et al.

(10) Patent No.: US 11,481,175 B2
(45) Date of Patent: Oct. 25, 2022

(54) ELECTRONIC DEVICE FOR DETECTING A DEFECTIVE PIXEL OF A DISPLAY DEVICE AND CONTROL METHOD THEREFOR

(71) Applicant: SAMSUNG ELECTRONICS CO., LTD., Suwon-si (KR)

(72) Inventors: Sanghoon Oh, Suwon-si (KR); Duseong Kang, Suwon-si (KR); Youngkook Kim, Suwon-si (KR); Hyewon Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/256,827

(22) PCT Filed: Jul. 2, 2019

(86) PCT No.: PCT/KR2019/008011
§ 371 (c)(1),
(2) Date: Dec. 29, 2020

(87) PCT Pub. No.: WO2020/022662
PCT Pub. Date: Jan. 30, 2020

(65) Prior Publication Data
US 2021/0366331 A1 Nov. 25, 2021

(30) Foreign Application Priority Data
Jul. 26, 2018 (KR) .................. 10-2018-0087407

(51) Int. Cl.
*G06F 3/14* (2006.01)
*G09G 3/00* (2006.01)

(52) U.S. Cl.
CPC ............ *G06F 3/1446* (2013.01); *G09G 3/00* (2013.01); *G09G 3/006* (2013.01);
(Continued)

(58) Field of Classification Search
CPC ...... G09G 3/006; G09G 5/38; G09G 2356/00; G09G 2300/026; G09G 2330/10; G09G 2320/0693; G06F 3/1446
See application file for complete search history.

(56) References Cited

U.S. PATENT DOCUMENTS

| 7,129,652 B2 | 10/2006 | Patel et al. |
| 8,395,636 B2 | 3/2013 | Gerets et al. |

(Continued)

FOREIGN PATENT DOCUMENTS

| JP | 2011-507032 A | 3/2011 |
| KR | 10-1113910 B1 | 2/2012 |

(Continued)

OTHER PUBLICATIONS

Communication dated Jul. 12, 2021 by the European Patent Office in European Application No. 19841696.8.
(Continued)

*Primary Examiner* — Dennis P Joseph
(74) *Attorney, Agent, or Firm* — Sughrue Mion, PLLC

(57) ABSTRACT

An electronic device and a control method therefor are provided. The electronic device comprises: a communication unit; and a processor configured to receive, from at least one cabinet of a plurality of cabinets, position information on a defective pixel detected in each cabinet through the communication unit, identify a position, on an entire screen consisting of the plurality of cabinets, where the defective pixel is present on the basis of the position information of the defective pixel, identify a defective area on the entire screen on the basis of the identified position, and provide information on the identified defective area. Here, each of the plurality of cabinets includes a plurality of display (Continued)

modules, wherein each of the plurality of display modules includes a plurality of pixels each consisting of a plurality of LEDs.

10 Claims, 10 Drawing Sheets

(52) U.S. Cl.
CPC ... *G09G 2300/026* (2013.01); *G09G 2330/08* (2013.01); *G09G 2330/10* (2013.01); *G09G 2354/00* (2013.01)

(56) References Cited

U.S. PATENT DOCUMENTS

| | | | |
|---|---|---|---|
| 8,766,880 | B2 | 7/2014 | Kharrati et al. |
| 8,843,331 | B2 | 9/2014 | Irissou et al. |
| 8,963,430 | B2 | 2/2015 | Walker |
| 9,858,886 | B2 | 1/2018 | Bae et al. |
| 9,881,545 | B2 | 1/2018 | Ha et al. |
| 2005/0185114 | A1 | 8/2005 | Cok |
| 2015/0154933 | A1* | 6/2015 | Bae ................ G09G 3/3611 345/618 |
| 2015/0187238 | A1* | 7/2015 | Hall ................ H05K 7/2039 40/544 |
| 2015/0254046 | A1* | 9/2015 | Hall ................ G06F 1/1601 345/1.3 |
| 2016/0078800 | A1* | 3/2016 | Ha ................... G09G 3/32 315/209 R |
| 2017/0154557 | A1* | 6/2017 | Shon ............... G09G 3/3275 |

FOREIGN PATENT DOCUMENTS

| | | |
|---|---|---|
| KR | 10-2013-0039218 A | 4/2013 |
| KR | 10-2015-0064469 A | 6/2015 |
| KR | 10-2016-0032948 A | 3/2016 |
| KR | 10-2018-0014379 A | 2/2018 |
| KR | 10-2018-0053465 A | 5/2018 |

OTHER PUBLICATIONS

Written Opinion (PCT/ISA/237) issued by the International Searching Authority in corresponding International Application No. PCT/KR2019/008011, dated Oct. 14, 2019.

International Search Report (PCT/ISA/210), issued by International Searching Authority in corresponding International Application No. PCT/KR2019/008011, dated Oct. 14, 2019.

Communication dated Jul. 17, 2022 issued by the Korean Intellectual Property Office in counterpart Korean Application No. 10-2018-0087407.

* cited by examiner

200

ELECTRONIC DEVICE FOR DETECTING A DEFECTIVE PIXEL OF A DISPLAY DEVICE AND CONTROL METHOD THEREFOR

TECHNICAL FIELD

The disclosure relates to an electronic device and a control method thereof, and more particularly, an electronic device for detecting a defective pixel of a display device and providing information on the defective pixel, and a control method thereof.

BACKGROUND ART

Various types of electronic products have been developed and distributed along with the development of the electronic technologies. There are increasing needs of users for various display devices along with an increase in use of display devices, and products with new functions are produced with efforts of manufacturers to respond to the needs of users.

In relation thereto, technologies related to an LED display device has been developed. However, the LED display device is disadvantageous in that a defective pixel is highly likely to be generated due to defectiveness of individual LED elements.

In particular, in a case of an LED display device of the related art, a plurality of individual elements were configured as one assembly. Accordingly, if a defective pixel is detected, only the number thereof was a problem and a position of the defective pixel was not necessary to be considered.

Meanwhile, in recent years, a module type LED display device configuring one screen by connecting a plurality of LED display modules to each other has been developed.

In regard to such a module type LED display device, the needs for considering the position of the defective pixel has arisen due to the connection in the module unit.

DISCLOSURE

Technical Problem

The disclosure is made in view of the above needs and an object of the disclosure is to provide an electronic device for identifying a position of a defective pixel detected on an LED display device and providing information on the identified defective pixel, and a control method thereof.

Technical Solution

In accordance with an aspect of the disclosure, there is provided an electronic device including a communicator, and a processor configured to receive, from at least one cabinet of a plurality of cabinets, position information on a defective pixel detected in each cabinet via the communicator, identify a position where the defective pixel is present on an entire screen configured with the plurality of cabinets based on the position information of the defective pixel, identify a defective area on the entire screen based on the identified position, and provide information on the identified defective area, in which each of the plurality of cabinets includes a plurality of display modules, and each of the plurality of display modules includes a plurality of pixels each configured with a plurality of LEDs.

The position information of the defective pixel may include coordinate information regarding the position of the defective pixel among a plurality of pixels included in each cabinet.

The processor may be configured to, based on a predetermined number or more of other defective pixels being present within a predetermined distance from a specific defective pixel based on the identified position, identify an area including the specific defective pixel and the other defective pixels as the defective area.

The processor may be configured to provide information on a position of the identified defective area.

The processor may be configured to identify a plurality of cabinets including a plurality of defective pixels present in the identified defective area among the plurality of cabinets, and provide information on the defective area based on the identified cabinets.

The processor may be configured to provide information on positions of the plurality of cabinets including the defective area.

The processor may be configured to identify at least one cabinet required to be replaced with another cabinet among the plurality of cabinets including the defective area, and provide information on the identified cabinet and a cabinet targeted to be replaced with the identified cabinet among a plurality of cabinets constituting the entire screen.

The processor may be configured to receive position information of the defective pixel from the at least one cabinet at every specific time, and provide the received position information of the defective pixel and surrounding environment information of the plurality of cabinets measured at every specific time to an external device.

In accordance with another aspect of the disclosure there is provided a method for controlling an electronic device, the method including receiving, from at least one cabinet of a plurality of cabinets, position information on a defective pixel detected in each cabinet, identifying a position where the defective pixel is present on an entire screen configured with the plurality of cabinets based on the position information of the defective pixel, identifying a defective area on the entire screen based on the identified position, and providing information on the identified defective area, in which each of the plurality of cabinets includes a plurality of display modules, and each of the plurality of display modules includes a plurality of pixels each configured with a plurality of LEDs.

The position information of the defective pixel may include coordinate information regarding the position of the defective pixel among a plurality of pixels included in each cabinet.

The control method may further include identifying coordinate information regarding a position where the defective pixel is present on the entire screen based on the coordinate information regarding the position of the defective pixel and identification information of the at least one cabinet.

The identifying the defective area on the entire screen may include, based on a predetermined number or more of other defective pixels being present within a predetermined distance from a specific defective pixel based on the identified position, identifying an area including the specific defective pixel and the other defective pixels as the defective area.

The providing the information on the identified defective area may include providing information on a position of the identified defective area.

The control method may further include identifying a plurality of cabinets including a plurality of defective pixels present in the identified defective area among the plurality of cabinets, and providing information on the defective area based on the identified cabinets.

The providing the information on the identified defective area may include providing information on positions of the plurality of cabinets including the defective area.

The providing the information on the identified defective area may include identifying at least one cabinet required to be replaced with another cabinet among the plurality of cabinets including the defective area, and providing information on the identified cabinet and a cabinet targeted to be replaced with the identified cabinet among a plurality of cabinets constituting the entire screen.

The control method may further include receiving position information of the defective pixel from the at least one cabinet at every specific time, and providing the received position information of the defective pixel and surrounding environment information of the plurality of cabinets measured at every specific time to an external device.

Effect of Invention

According to the various aspects of the disclosure, it is possible to identify a defective pixel that is highly likely to be recognized by considering positions of defective pixels detected on a module type display device and provide information regarding thereto. In a case of the module type display device, a display module where a defective pixel is generated may be replaced with another display module or the position thereof may be moved to reduce visibility of the defective pixel, thereby maintaining quality of a screen to be displayed.

BEST MODE

Not Applicable

DETAILED DESCRIPTION OF EXEMPLARY EMBODIMENTS

Figure 1:
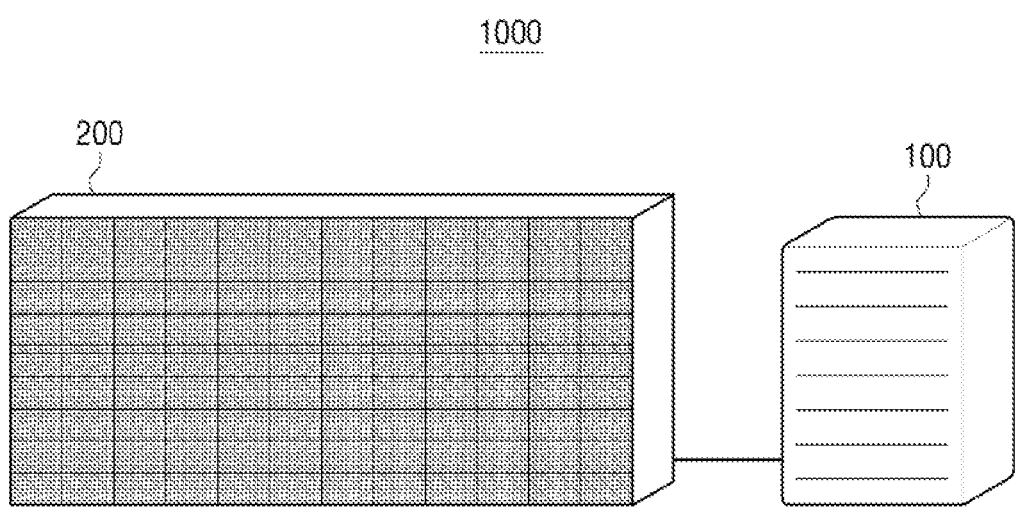
FIG. 1 is a diagram illustrating an electronic device and a display device according to an embodiment.

The disclosure will be described in greater detail below after briefly explaining the terms used in the disclosure.

The terms used in embodiments of the disclosure have been selected as widely used general terms as possible in consideration of functions in the disclosure, but these may vary in accordance with the intention of those skilled in the art, the precedent, the emergence of new technologies and the like. In addition, in a certain case, there may also be an arbitrarily selected term, in which case the meaning will be described in the description of the disclosure. Therefore, the terms used in the disclosure should be defined based on the meanings of the terms themselves and the contents throughout the disclosure, rather than the simple names of the terms.

The embodiments of the disclosure may be variously changed and include various embodiments, and specific embodiments will be shown in the drawings and described in detail in the description. However, it should be understood that this is not to limit the scope of the specific embodiments and all modifications, equivalents, and/or alternatives included in the disclosed spirit and technical scope are included. In describing the disclosure, a detailed description of the related art may be omitted when it is determined that the detailed description may unnecessarily obscure a gist of the disclosure.

The terms "first," "second," or the like may be used for describing various elements but the elements may not be limited by the terms. The terms are used only to distinguish one element from another.

Unless otherwise defined specifically, a singular expression may encompass a plural expression. It is to be understood that the terms such as "comprise" or "consist of" are used herein to designate a presence of characteristic, number, step, operation, element, part, or a combination thereof, and not to preclude a presence or a possibility of adding one or more of other characteristics, numbers, steps, operations, elements, parts or a combination thereof.

A term such as "module" or a "unit" in the disclosure may perform at least one function or operation, and may be implemented as hardware, software, or a combination of hardware and software. Further, except for when each of a plurality of "modules", "units", and the like needs to be realized in an individual hardware, the components may be integrated in at least one module and be implemented in at least one processor (not illustrated).

Hereinafter, with reference to the accompanying drawings, embodiments of the disclosure will be described in detail. But, the disclosure may be implemented in various different forms and is not limited to the embodiments described herein. In addition, in the drawings, the parts not relating to the description are omitted for clearly describing the disclosure, and the same reference numerals are used for the same parts throughout the specification.

Hereinafter, various embodiments of the disclosure will be described in detail with reference to the drawings.

FIG. 1 is a diagram illustrating an electronic device and a display device according to an embodiment.

An electronic device 100 may provide an image to a display device 200 and the display device 200 may display an image received from the electronic device 100.

Meanwhile, the display device 200 may be a display device including a plurality of LED elements.

When a defective pixel is generated in the display device 200, the display device 200 may transmit information on the defective pixel to the electronic device 100.

The defective pixel herein may refer to a pixel not functioning properly among a plurality of pixels constituting a screen. Since the plurality of pixels constituting a screen are configured with a plurality of LEDs, the defective pixel may refer to an LED element with defectiveness. Accordingly, in the disclosure, the defective pixel may refer to a pixel not functioning properly on a display screen and may also refer to an LED element with defectiveness among the plurality of LEDs.

When one defective pixel is generated, the defective pixel is not visually recognizable by a user due to an extremely small size of the one defective pixel with respect to the entire screen, but if defective pixels are adjacent to each other to form a group, the defective pixels may be visually recognizable by the user.

Meanwhile, the display device 200 in FIG. 1 may be a module type display device. The module type display device may be a display device including a plurality of display modules. The display device 200 may display one image over the plurality of display modules.

In detail, the plurality of display modules may be connected to each other to form one cabinet, and one cabinet may form a display of the display device 200 or a plurality of cabinets may be connected to each other to form a display of the display device 200.

Since the display device 200 is configured with the plurality of display modules, the defective pixels may be generated to be adjacent to each other in the plurality of display modules to form a defective pixel group. The defective pixel group may be formed in one cabinet or formed over a plurality of cabinets.

When the defective pixels are adjacent to each other to form a group, the defective pixel may be visually recognizable and this may disturb the user from watching.

Since the display device 200 is configured with the plurality of display modules, in a case where the defective pixels are adjacent to each other to form a group, a display module, where the defective pixel is present, or a cabinet including such a display module may be replaced with a new component to remove the defective pixel.

Meanwhile, when the defective pixels adjacent to each other are generated in a plurality of cabinets to form a defective pixel group, the position of the cabinet of the display device 200 may be rearranged to disperse the defective pixel group.

Specifically, positions of a cabinet where the defective pixel is generated and another cabinet included in the display device 200 may be exchanged so that the defective pixel group is not formed in the display device 200.

As described above, if the defective pixel group is dispersed and the defective pixels are not adjacent to each other, the defective pixel may not be visually recognizable by the user.

Hereinafter, the display device connected to the electronic device according to an embodiment of the disclosure will be described in detail.

Figure 2:
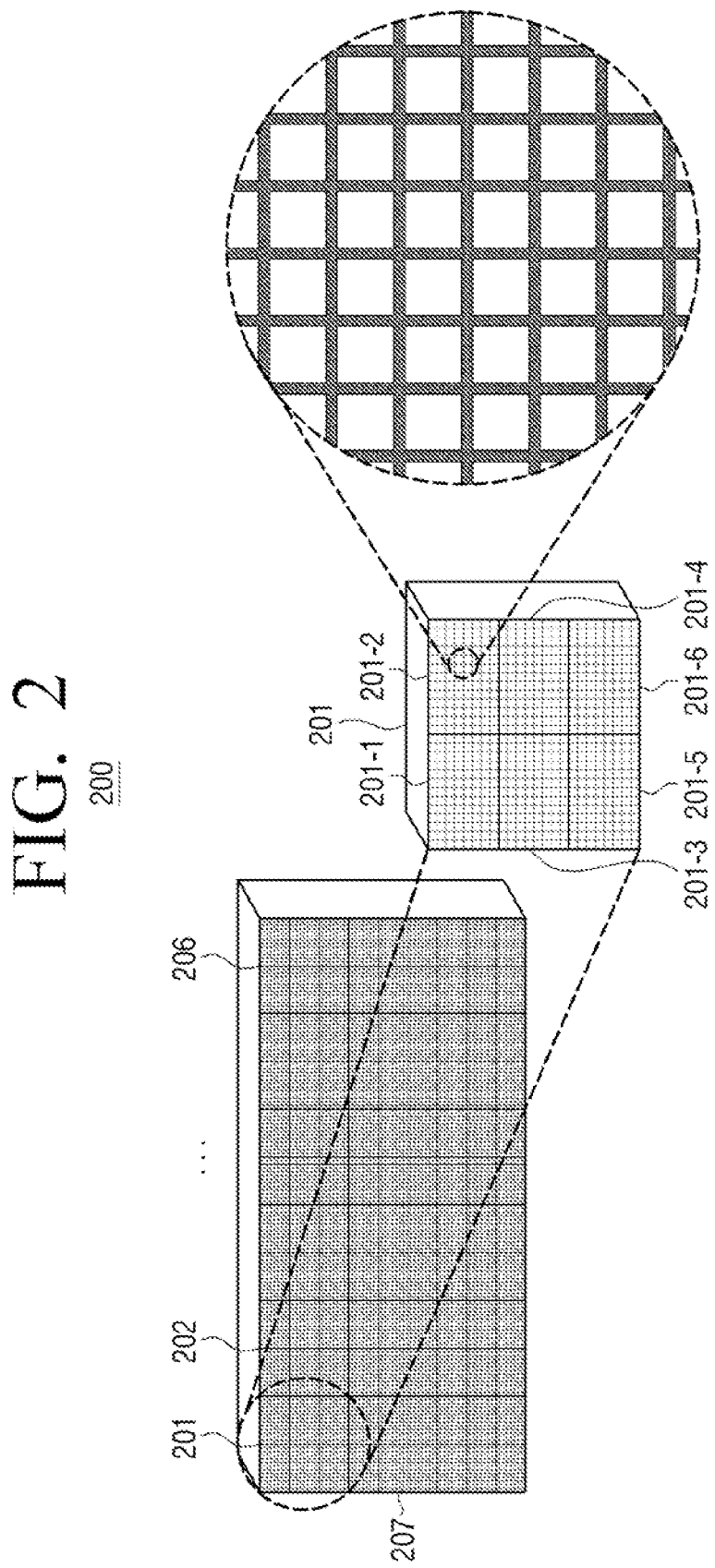
FIG. 2 is a diagram illustrating a display device according to an embodiment.

FIG. 2 is a diagram illustrating a display device according to an embodiment.

Referring to FIG. 2, the display device 200 may include a plurality of cabinets 201, 202, 203, . . . , and n, and one cabinet 201 may include a plurality of display modules 201-1, 201-2, . . . , and 201-*m*. In other words, the display device 200 may be implemented as a module type display device in which a plurality of display modules are physically connected to each other.

Meanwhile, for convenience of description, in FIG. 2, different reference numerals are given to the plurality of cabinets 201, 202, 203, . . . , and n, but the plurality of cabinets are same as each other since those have the same configuration and perform same function. Accordingly, in the description regarding the cabinet below, the description will be made with one cabinet 201.

The cabinet 201 may include a base plate (not illustrated) for mounting each of the plurality of display modules 201-1, . . . , and 201-*m*. Herein, the base plate (not illustrated) may be implemented in a form that each of the display modules 201-1, . . . , and 201-*m* is mounted on a front surface of the base plate (not illustrated).

The base plate (not illustrated) may include a plurality of connectors to be coupled to another cabinet 202.

Accordingly, the cabinet 201 according to an embodiment of the disclosure may be coupled to other cabinets 202 or 207 from at least one side surface among upper, lower, right, and left side surfaces, and the other cabinet 202 may also be coupled to still another cabinet 203 from at least one side surface among upper, lower, right, and left side surfaces to implement a large-sized display device.

FIG. 2 illustrates the display device 200 of 6×3 in which six cabinets in the horizontal direction and three cabinets in the vertical direction are coupled to each other, but this is merely an embodiment, and the number and the arrangement of the cabinets may be variously changed.

Each of the plurality of cabinets 201, 202, . . . , and n may include a processor for controlling general operations of the cabinet. The electronic device 100 may divide an image to be displayed on the entire screen of the display device 200 and transmit the divided image to each cabinet, and the processor of the cabinet may control the cabinet to display the received divided image on the cabinet.

However, this is merely an embodiment and each of the plurality of display modules 201-1, . . . , and 201-*m* may include a processor for controlling general operations of the display module. In this case, the processor of each of the plurality of display modules 201-1, . . . , and 201-*m* may control the display module to display the divided image received from the electronic device 100.

Meanwhile, each of plurality of display modules 201-1, . . . , 201-*m*, 202-1, . . . , 202-*m*, . . . , n-1, . . . , and n-m included in the cabinets may be implemented as an LED display module including a light emitting diode (LED).

Specifically, each of the plurality of display modules 201-1, . . . , 201-*m*, . . . , n-1, . . . , and n-m may be implemented as an LED display module including a plurality of LEDs implemented as one pixel with a red LED R, a green LED G, and a blue LED B which are sub-pixels. In other words, the display module may include a plurality of pixels each configured with a plurality of LEDs.

Herein, the plurality of pixels may be arranged in a matrix form (e.g., X×Y, wherein X and Y are natural numbers). Specifically, the matrix may be in a form of equal arrangement (e.g., X=Y, wherein X and Y are natural numbers) and may be in a form of other arrangements (e.g., X≠Y, wherein X and Y are natural numbers).

The LED of the display module according to an embodiment of the disclosure may be implemented as a micro LED. Herein, the micro LED may refer to a micro light emitting element which emits light by itself without a color filter, as an LED having a size of approximately 5 to 100 micrometers.

However, such an LED display module is merely an embodiment and the display module may be implemented as an organic LED (OLED), an active matrix OLED (AMOLED), a plasma display panel (PDP), or the like. Hereinafter, for convenience of description, the display module according to an embodiment of the disclosure will be described assuming that it is an LED display module.

Meanwhile, the display device 200 may display various images by driving a plurality of LEDs.

Specifically, when the display device 200 receives an image signal from the electronic device 100, the display device 200 may divide the received image signal by the number of cabinets 201, 202, . . . , and nor the display modules 201-1, ..., 201-*m*, ..., n-1, ..., and n-m, and transmit the divided image signals to the cabinets 201, 202, ..., and n or the display modules 201-1, ..., 201-*m*, ..., n-1, ..., and n-m, respectively. The divided image signals may be image signals for a screen divided by the number of the cabinets 201, 202, ..., and n or the display modules 201-1, ..., 201-*m*, ..., n-1, ..., and n-m.

If the display device 200 includes 18 cabinets in total arranged with six cabinets horizontally and three cabinets vertically, the display device 200 may divide an image to be displayed on a screen into six images horizontally and three images vertically to divide the scree into 18 screens in total.

The image signal for each of the divided screens may be transmitted to each of the cabinets 201, 202, ..., and n of the display device 200 in sequence. For example, an image signal for an upper left end of the entire screen may be transmitted to a cabinet on an upper left end of the display device 200.

In the same manner, each of the cabinets 201, 202, ..., and n including the plurality of display modules may divide the received image signal and each display module may display a screen according to the divided image signal.

Meanwhile, this is merely an embodiment, and the display device 200 may divide the received image signal by the number of display modules constituting the entire screen and transmit each of the divided image signals to each display module.

Each display module that has received the image signal may drive an LED to corresponding to the received image signal (e.g., turning on or off, flickering, or the like), and accordingly, the display device 200 may display various images through the display module.

However, if the LED is not driven according to the image signal, a defective pixel may be generated on a screen corresponding to the LED not driven according to the image signal.

When the defective pixel is generated, the display device 200 may transmit information on the defective pixel to the electronic device 100.

Specifically, the cabinet 201 including the defective pixel among the plurality of cabinets included in the display device 200 may transmit the information on the defective pixel to the electronic device 100.

However, this is merely an embodiment, and a display module with the generated defective pixel among the plurality of display modules included in the display device 200 may transfer the information on the defective pixel to the electronic device 100.

The information on the defective pixel may include position information and time information of the defective pixel, cabinet information including an LED display module where the defective pixel is present, defective LED information, and the like.

The position information of the defective pixel may include coordinate information regarding the position of the defective pixel among the plurality of pixels included in the cabinet. Specifically, the position information of the defective pixel may be information representing the position of the defective pixel as coordinates based on a specific point in the cabinet where the defective pixel is generated.

Meanwhile, this is merely an embodiment, and the position information of the defective pixel may be coordinate information regarding the defective pixel among the pixels included in the display module.

The time information of the defective pixel may be time when the defective pixel is generated. However, this is merely an embodiment, and the time information of the defective pixel may be time when the display device 200 detects the defective pixel.

The cabinet information including the LED display module where the defective pixel is present may include identification information of a cabinet where the defective pixel is present, position information of a cabinet on the entire screen, and the like.

In addition, the defective LED information may include information on an LED, corresponding to the defective pixel, which does not function properly thereby generating the defective pixel, among a red LED R, a green LED G, and a blue LED B.

Meanwhile, when the information on the defective pixel is received, the electronic device 100 may identify the position of the defective pixel on the entire screen corresponding to the plurality of cabinets by using the received information on the defective pixel, and provide the information on the defective pixel to the display device 200.

Hereinafter, the electronic device 100 connected to the display device 200 according to an embodiment of the disclosure will be described in more detail with reference to FIG. 3.

Figure 3:
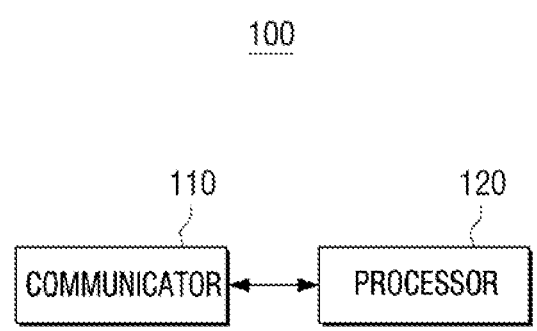
FIG. 3 is a block diagram illustrating an electronic device according to an embodiment.

FIG. 3 is a block diagram illustrating an electronic device according to an embodiment.

Referring to FIG. 3, the electronic device 100 may include a communicator 110 and a processor 120.

The communicator 110 may be an element for performing communication between the electronic device 100 and the display device 200. The communicator 110 may transmit and receive various data to and from the plurality of cabinets 201, 202, ..., and n of the display device 200.

The communicator 110 may transmit image information to the display device 200.

In addition, the communicator 110 may receive defective pixel information generated in the display device 200 from the display device 200.

For this, the communicator 110 may be implemented in various forms according to the implementation method of the electronic device 100.

For example, the communicator 110 may include a connection part for wired communication and the connection part may transmit/receive signals/data according to the standard of high definition multimedia interface (HDMI), consumer electronics control (HDMI-CEC), a USB, a component, and the like and include at least one or more connectors or terminals corresponding to the standard thereof. The communicator 110 may perform wired communication with the plurality of cabinets 201, 202, ..., and n via a wired local area network (LAN).

In addition, the communicator 110 may also include various communication modules such as wired Ethernet, a near field wireless communication module, a wireless communication module, and the like to perform the wireless communication with the display device 200.

The near field wireless communication module may be a module for communicating with the display device 200 positioned near according to a near field wireless communication method such as Bluetooth (BT), Bluetooth Low Energy (BLE), ZigBee, or the like. In addition, the wireless communication module may be a module connected to an external network according to a wireless communication protocol such as Wi-Fi, IEEE, or the like to perform the communication. Further, the wireless communication module may further include a mobile communication module to be connected to a mobile communication network to perform the communication according to various mobile communication standards such as 3rd Generation (3G), 3rd Generation Partnership Project (3GPP), Long Term Evolution (LTE), 5 generation networks (5G networks), and may further include mobile communication modules newly appearing according to the development of technology.

Meanwhile, the processor 120 may be an element for controlling general operations of the electronic device 100 and a signal flow between the internal elements of the electronic device 100 and processing data. Specifically, the processor 120 may control various elements of hardware or software included in the electronic device 100 and perform various data processing and operations. In addition, the processor 120 may load and process an instruction or data received from at least one of other elements on a memory and store various pieces of data in a non-volatile memory. For this, the processor 120 may be implemented as a dedicated processor (e.g., an embedded processor) for performing the corresponding operations or a generic-purpose processor (e.g., a central processing unit (CPU) or an application processor) capable of performing the corresponding operations by executing one or more software programs stored in a memory device.

In an embodiment of the disclosure, the processor 120 may receive the position information regarding the defective pixel detected in each cabinet from at least one cabinet among the plurality of cabinets 201, 202, . . . , and n of the display 200 via the communicator 110.

The processor 120 may identify the position where the defective pixel is present on the entire screen configured with the plurality of cabinets based on the position information of the defective pixel.

Figure 4:
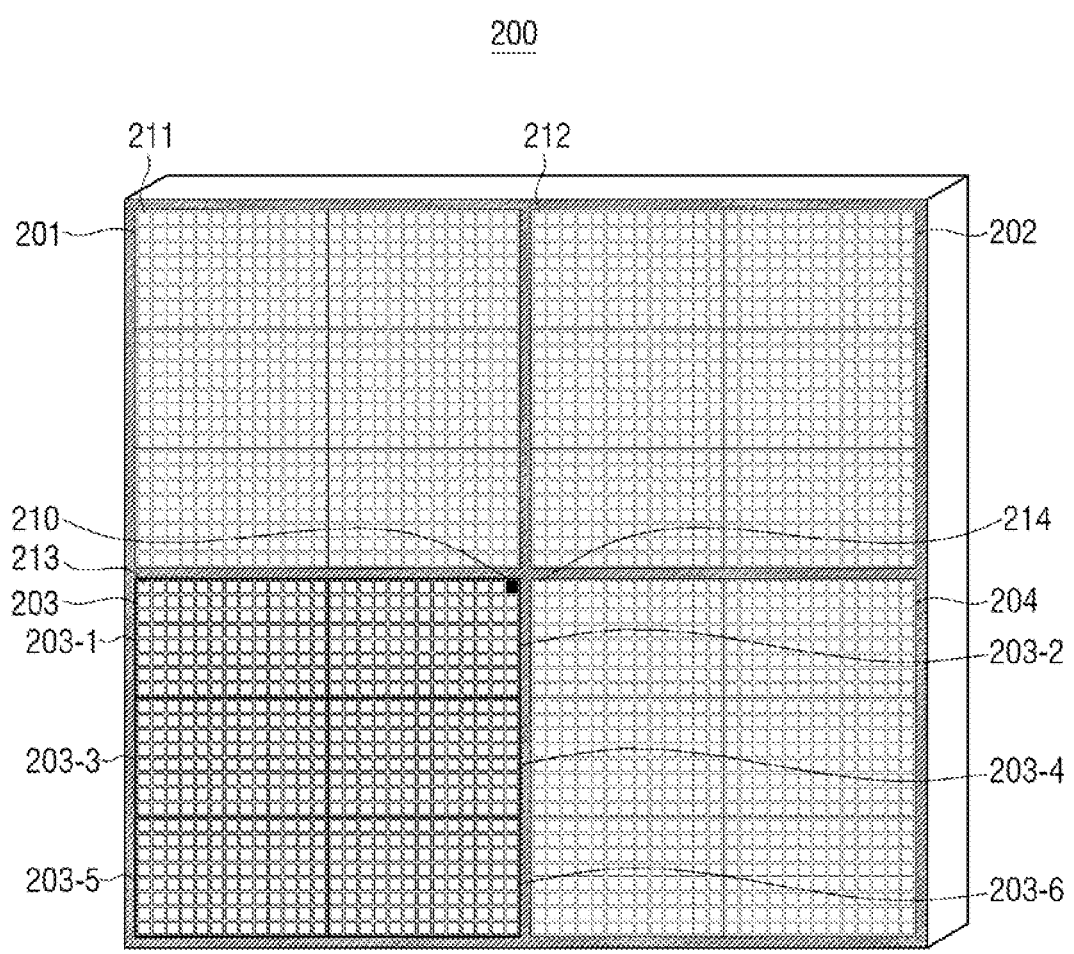
FIG. 4 is a diagram illustrating a method for an electronic device to identify coordinates of a defective pixel according to an embodiment.

FIG. 4 is a diagram illustrating a method for an electronic device to identify coordinates of a defective pixel according to an embodiment.

Referring to FIG. 4, a defective pixel 210 is represented by displaying an LED of the display device 200 where the defective pixel 210 is generated in black in the drawings of the disclosure.

As described above, the processor 120 may receive position information regarding the defective pixel included in the cabinet from at least one cabinet among the plurality of cabinets 201, 202, . . . , and n via the communicator 110, and identify the position where the defective pixel is present on the entire screen configured with the plurality of cabinets based on the position information of the defective pixel.

Herein, the position information of the defective pixel 210 may include coordinate information regarding the position of the defective pixel 210 among the plurality of pixels included in each of the cabinets 201, 202, . . . , and n.

The coordinate information of the defective pixel 210 may be generated by using one pixel among a plurality of pixels included in the cabinet 203 including the defective pixel 210 as a reference pixel.

Specifically, the cabinet 203 may select an arbitrary pixel among the plurality of pixels and set this pixel as the reference pixel. A coordinate value of the reference pixel may be set as (0,0).

When the defective pixel is positioned on the right side of the reference pixel, the cabinet 203 may obtain an x coordinate value of the defective pixel by increasing a value from the x coordinate value (0) of the reference pixel by a distance of the defective pixel separated from the reference pixel to the right.

When the defective pixel is positioned on the left side of the reference pixel, the cabinet 203 may obtain an x coordinate value of the defective pixel by decreasing a value from the x coordinate value (0) of the reference pixel by a distance of the defective pixel separated from the reference pixel to the left.

When the defective pixel is positioned on an upper side of the reference pixel, the cabinet 203 may obtain a y coordinate value of the defective pixel by increasing a value from the y coordinate value (0) of the reference pixel by a distance of the defective pixel separated from the reference pixel to the upper side.

In addition, when the defective pixel is positioned on a lower side of the reference pixel, the cabinet 203 may obtain a y coordinate value of the defective pixel by decreasing a value from the y coordinate value (0) of the reference pixel by a distance of the defective pixel separated from the reference pixel to the lower side.

Meanwhile, the distance herein may refer to a pixel unit.

For example, referring to FIG. 4, it is assumed that each of a plurality of display modules 203-1, 203-2, . . . , and 203-m included in the cabinet 203 may be configured with pixels of 13×8 and a pixel 213 on the upper left end of the cabinet 203 is a reference pixel.

The cabinet 203 may set a coordinate value of the reference pixel 213 as (0,0), determine that the defective pixel 210 is present at a position separated from the reference pixel 213 by 26 pixels to the right, and set coordinates of the defective pixel 210 as (26,0).

However, this is merely an embodiment, and the coordinate value of the defective pixel may be changed according to the position of the reference pixel. When the reference pixel is a pixel on the lowermost and leftmost end of the cabinet, the coordinates of the defective pixel 210 may be (26,24).

In order that the processor 120 may identify the position information of the defective pixel on the entire screen of the display device 200, coordinate information of the defective pixel 210 transmitted to the electronic device 100 by the cabinet 203 may include information on the reference pixel 213 used during a process of calculating the coordinates of the defective pixel 210.

Meanwhile, the electronic device 100 may receive identification information of the cabinet from the cabinet 203 including the defective pixel. Herein, the identification information of the cabinet may refer to information for identifying the position of the cabinet where the detective pixel is generated on the entire screen including the plurality of cabinets 201, 202, 203, and 204, such as an ID of the cabinet, the position information of the cabinet, or the like.

The processor 120 may identify the position of the cabinet where the defective pixel is generated and the position of the defective pixel on the entire screen including the plurality of cabinets 201, 202, 203, and 204 by using the identification information of the cabinet received from the cabinet 203.

For this, ID information of each of the plurality of cabinets 201, 202, 203, and 204, the position information on the entire screen, and the like may be stored in the electronic device 100 in advance.

For example, information indicating that the first cabinet 201 of the display device 200 is disposed on the upper left side of the display, the second cabinet 202 is disposed on the right side of the first cabinet, the third cabinet 203 is disposed below the first cabinet, and the fourth cabinet 204 is disposed on the right side of the third cabinet 203 or below the second cabinet 202 may be stored in the electronic device 100 in advance.

The processor 120 may identify the coordinate information regarding the position where the defective pixel is present on the entire surface based on the coordinate information regarding the position of the defective pixel and the identification information of the at least one cabinet.

Specifically, the processor 120 may identify the position of the cabinet 203 including the defective pixel 210 on the entire screen by using the identification information of the cabinet 203 including the defective pixel 210 and then identify the position where the defective pixel 210 is present on the entire screen based on the position of the cabinet 203 on the entire screen.

For this, the processor 120 may determine an arbitrary cabinet among the plurality of cabinets 201, 202, 203, and 204 as a reference cabinet, and set arbitrary pixels 211, 212, 213, and 214 among the pixels included in each of the plurality of cabinets 201, 202, 203, and 204 as reference pixels. Herein, the reference cabinet and the reference pixel may refer to a cabinet and a pixel in each cabinet which are references for identifying the coordinates of the defective pixel 210 on the entire screen.

The reference pixels 211, 212, 213, and 214 included in the plurality of cabinets 201, 202, 203, and 204, respectively, may be pixels positioned on the same position in each of the cabinets 201, 202, 203, and 204. When the pixel 211 on the upper leftmost end of the first cabinet 201 is set as the reference pixel, the pixels 212, 213, and 214 on the upper leftmost ends of the second, third, and fourth cabinets 202, 203, and 204 may be set as the reference pixels of the second, third, and fourth cabinets.

The processor 120 may identify a coordinate value (0,−25) of the reference pixel 213 of the third cabinet 203 on the entire screen by using the position information indicating that the third cabinet 203 including the defective pixel 210 is connected to the immediately lower portion of the first cabinet 201.

The processor 120 may identify a coordinate value (26,−25) of the defective pixel 210 on the entire screen based on the defective pixel information received from the third cabinet 203. In other words, when the pixel 213 is set as the reference pixel in the third cabinet 203, the coordinate value of the defective pixel 210 is (26,0), but when the pixel 211 is set as the reference pixel on the entire screen, the coordinate value of the defective pixel 210 may be (26,−25).

However, the method for the processor 120 to identify the coordinate value of the defective pixel on the entire screen is merely an embodiment and the processor 102 may identify the coordinate value of the defective pixel on the entire screen by other methods.

Meanwhile, FIG. 4 illustrates a case where one defective pixel is generated among the plurality of pixels included in the plurality of cabinets, but even if a plurality of defective pixels are generated, the coordinate information of each defective pixel on the entire screen may be identified by the same method as described above.

In addition, the processor 120 may determine whether other defective pixels are present around the identified defective pixel position and identify a defective area including a plurality of defective pixels on the entire screen based on this.

Hereinafter, a method for identifying the defective area will be described in detail with reference to FIG. 5.

Figure 5:
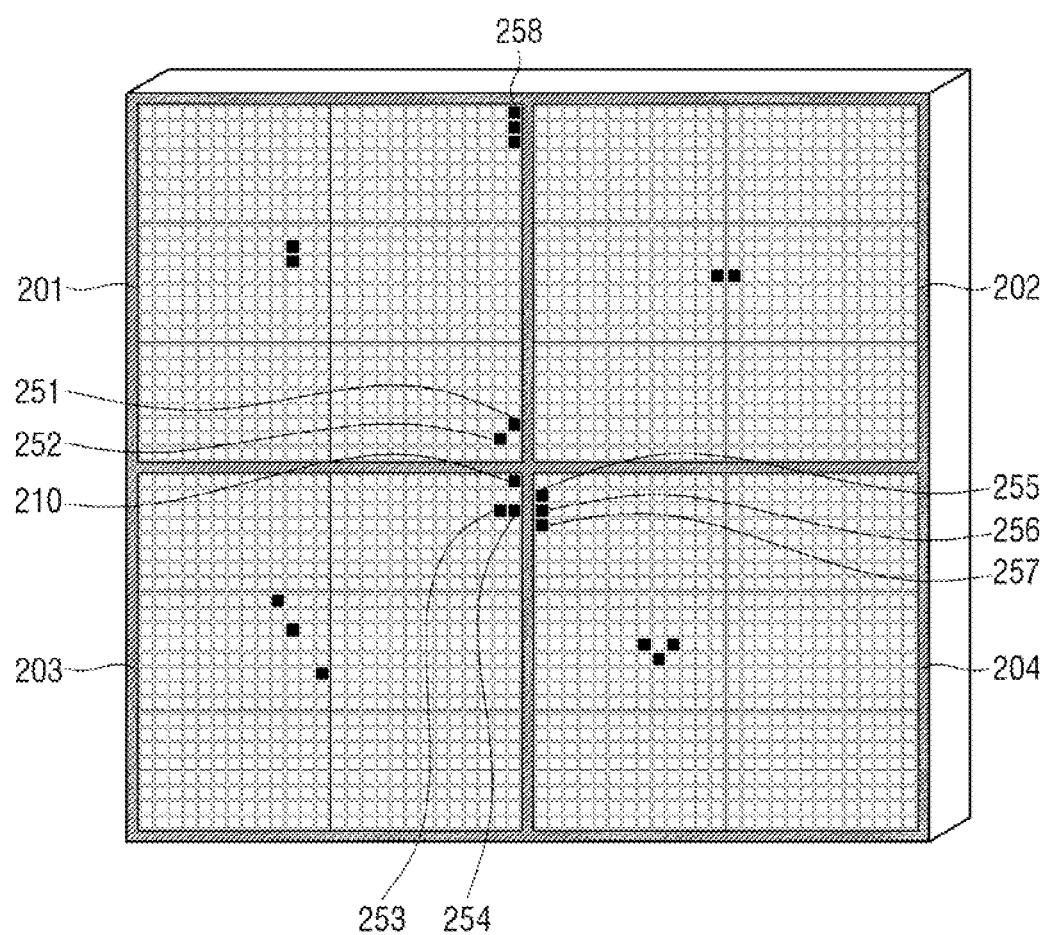
FIG. 5 is a diagram illustrating an electronic device for identifying a defective area according to an embodiment.

FIG. 5 is a diagram illustrating an electronic device for identifying a defective area according to an embodiment.

FIG. 5 illustrates a plurality of defective pixels 210, 251, . . . , and 258 present in the plurality of cabinets 201, 202, 203, and 204 included in the display device 200.

The processor 120 may receive information of the defective pixels included in the cabinets from each of the plurality of cabinets 201, 202, 203, and 204, identify the positions of the defective pixels on the entire screen by using the received information of the defective pixels, and identify defective areas on the entire screen based on the identified positions.

The defective area herein may refer to a defective pixel group including a plurality of defective pixels which is a defective pixel area visually recognizable by the user.

Specifically, when a predetermined number or more of the other defective pixels 251, . . . , and 257 are present within a predetermined distance from the specific defective pixel 210 based on the positions of the identified defective pixels 210, 251, . . . , and 258, the processor 120 may identify an area including the specific defective pixel 210 and the other defective pixels 251, . . . , and 257 as the defective area.

The processor 120 may use the Euclidean distance formula in order to calculate a distance between the plurality of defective pixels. In other words, when the coordinates of a defective pixel A is $(X_A, Y_A)$ and coordinates of a defective pixel B is $(X_B, Y_B)$, a distance D between the defective pixel A and the defective pixel B may be calculated as below.

$$D = \sqrt{(X_B - X_A)^2 - (Y_B - Y_A)^2}$$

When the number of the plurality of other defective pixels present within the predetermined distance from the specific defective pixel is found to be predetermined number or more by using the distance between the defective pixels, the processor 120 may identify the specific defective pixel 210 and the plurality of other defective pixels 251, . . . , and 257 within the predetermined distance as the defective area, and provide information on the identified defective area.

The predetermined distance and the predetermined number may refer to a minimum unit of the defective pixel group visually recognizable by the user. Herein, the distance may refer to a pixel unit.

When the predetermined distance is set as 3 and the predetermined number if set as 5, the processor 120 may calculate, with respect to the plurality of defective pixels, whether the number of other defective pixels present within the distance of 3 is 5 or more.

In a case of an embodiment illustrated in FIG. 5, when the predetermined distance is set as 3 and the predetermined number is set as 5, the number of defective pixels 251, 252, 253, 254, 255 and 256 present within the distance of 3 from the defective pixel 210 is 5 or more, and accordingly, the processor 120 may identify the area including the defective pixels 210, 251, 252, 253, 254, 255 and 256 as the defective area.

The processor 120 may provide information on the position of the identified defective area after identifying the defective area. The information on the position of the defective area may include coordinate information of the plurality of defective pixels 210, 251, 252, 253, 254, 255 and 256 included in the defective area, the information of the plurality of cabinets 201, 203, and 204 including the defective areas, image information representing the position of the defective area on the entire screen, the cabinet information to be replaced, and the like.

The cabinet information to be replaced, herein, may refer to information of a cabinet at a position to be changed, in order to reduce visibility of the defective area by dispersing the defective area including the plurality of defective pixels 210, 251, 252, 253, 254, 255 and 256 and may include identification information and position information of the cabinet, and the like.

The processor 120 may identify the cabinets 201, 203, and 204 including the plurality of defective pixels 210, 251, 252, 253, 254, 255, and 256 present in the identified defective area among the plurality of cabinets and provide the information on the defective area based on the identified cabinets 201, 203, and 204.

In addition, the processor 120 may provide the information on the positions of the plurality of cabinets 201, 203, and 204 including the defective area. The information on the positions of the cabinets 201, 203, and 204 may include identification information of the cabinet, the position information on the entire screen, and the like.

The processor 120 may identify at least one cabinet 203 required to be replaced with another cabinet among the cabinets including the defective area, and provide information on the identified cabinet and the cabinet targeted to be replaced with the identified cabinet among the plurality of cabinets constituting the entire screen.

The cabinet required to be replaced among the cabinets including the defective area may be a cabinet including the defective pixel 210 which is a reference of determination of the defective area.

In order to identify the cabinet targeted to be replaced with the cabinet 203 required to be replaced, the processor 120 may identify the entire screen of the display device 200 by assuming that the cabinet 203 required to be replaced is exchanged with each of the other cabinets 201, 202, and 204 included in the display device 200. In other words, the electronic device 100 may consider every cases where the cabinet 203 required to be replaced is able to be exchanged.

Specifically, the processor 120 may predict the entire screen to be displayed in each case where the cabinet 203 required to be replaced is exchanged with other cabinets 201, 202, and 204, by assuming that the position of the cabinet 203 required to be replaced is exchanged with the position of each of the other cabinets 201, 202, and 204.

In addition, the processor 120 may identify whether the recognizable defective area is present on the entire screen, when the cabinet 203 required to be replaced is exchanged with the other cabinets 201, 202, and 204, by using the predicted entire screen.

Referring to FIG. 5, the processor 120 assumes that the cabinet 203 required to be replaced is exchanged with the cabinet 201, predict the entire screen to be displayed in such a case, and identify that the defective area is present based on the defective pixel 258 even after the cabinet 203 is exchanged with the cabinet 201 by using the predicted entire screen.

In the same manner, the processor 120 may assume that the cabinet 203 required to be replaced is exchanged with each of the cabinets 202 and 204, predict the entire screen to be displayed in each case, and identify that the defective area is not present, when the cabinet 203 is exchanged with the cabinet 202 and when the cabinet 203 is exchanged with the cabinet 204 by using the predicted entire screen.

Meanwhile, unlike FIG. 5, when more cabinets are combined to the right side of the cabinets 202 and 204, the entire screen after the exchange of the cabinet 203 has to be determined by including the cabinets combined to the right side of the cabinets 202 and 204.

Meanwhile, when the cabinet 203 required to be replaced is exchanged with the cabinet 204 targeted to be replaced, the cabinet 203 may be present at the lower right end of the entire screen and the cabinet 204 may be present at the lower left end of the entire screen.

After the positions of the cabinet 203 and the cabinet 204 are exchanged with each other, the processor 120 may change the position information of the cabinet 203 and the position information of the cabinet 204 to each other. In other words, the identification information of the cabinet 203, the position information thereof on the entire screen, and the like may be changed to the identification information of the cabinet 204, the position information thereof on the entire screen, and the like, and the identification information of the cabinet 204, the position information thereof on the entire screen, and the like may be changed to the identification information of the cabinet 203, the position information thereof on the entire screen, and the like.

Meanwhile, the processor 120 may provide the information on the position of the detective area to the display device 200 or an external device 300.

Figure 6A:
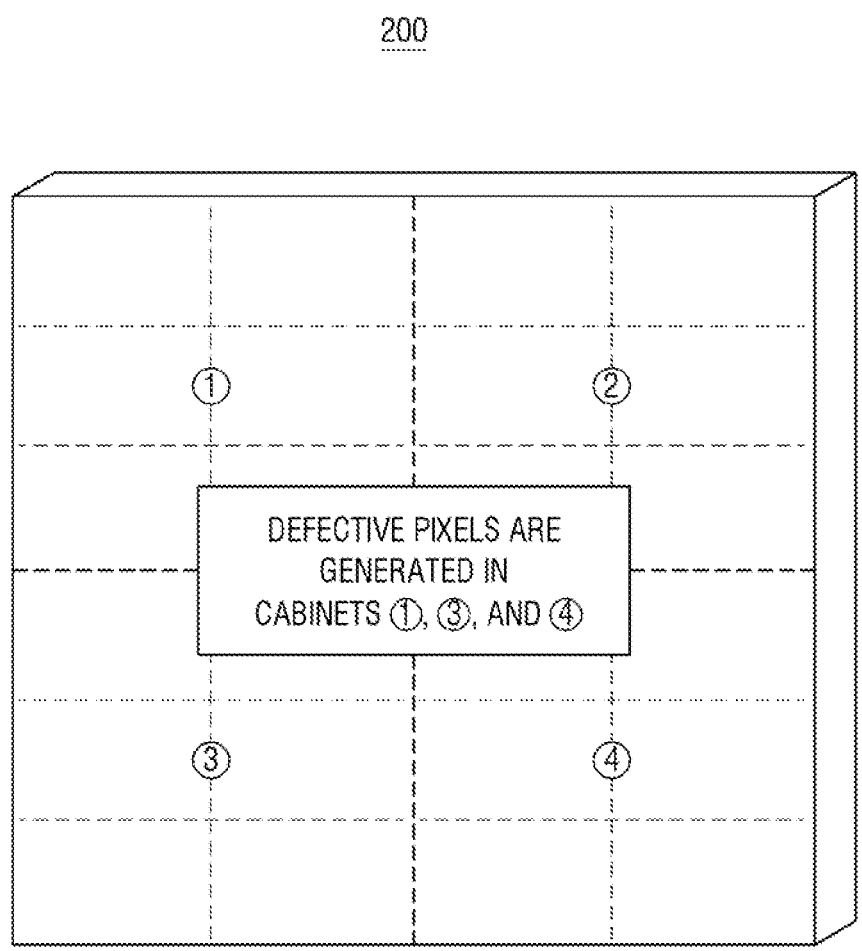
FIGS. 6A and 6B are diagrams illustrating screens for displaying information on a defective area on a display device or an external device.
Figure 6B:
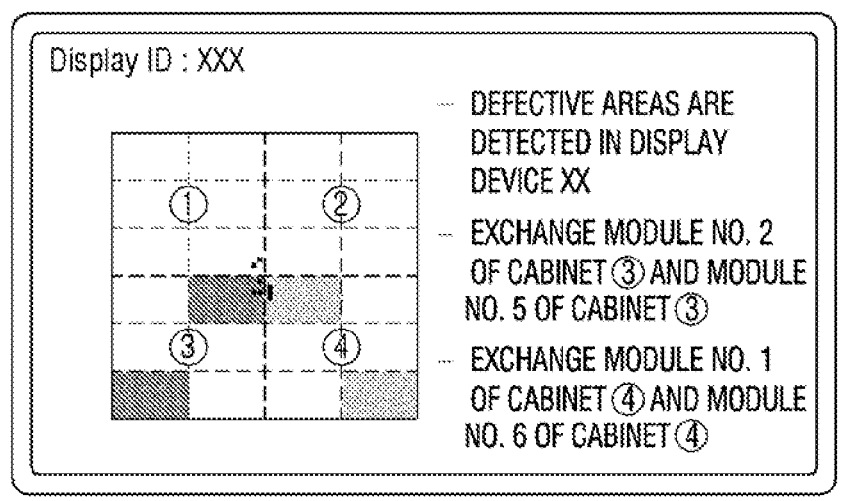

With regard to this, FIGS. 6A and 6B are diagrams illustrating screens for displaying information on a defective area on the display device 200 or the external device 300.

Specifically, FIG. 6A illustrates a display screen of the display device 200 that has received the information on the defective area from the electronic device 100.

The processor 120 may transmit the information on the identified defective area to the display device 200.

When the display device 200 receives the information on the identified defective area from the electronic device 100, referring to FIG. 6A, the display device 200 may display the screen representing the information on the cabinet where the defective area is generated.

However, this is merely an embodiment, and the display device 200 may display not only the information regarding the cabinet where the defective area is generated, but also the information of the cabinet required to be replaced, the information of the cabinet targeted to be replaced, and the like.

In addition, unlike FIG. 6A, the display device 200 may periodically turn on and off the plurality of LEDs included in the cabinet where the defective area is generated on the entire screen, and make the image to be displayed on the cabinet where the defective area is generated flicker periodically, so that the user may recognize the cabinet where the defective area is present.

Meanwhile, the processor 120 may transmit the information on the defective area to the external device 300. Herein, the external device 300 may be a user terminal device of an administrator of the display device 200.

FIG. 6B illustrates a display screen of the external device 300 that has received the information on the defective area from the electronic device 100.

When the external device 300 receives the information on the defective area from the electronic device 100, the external device 300 may display the entire screen of the display device 200 and the information on the defective area on a screen of the external device 300.

Herein, since the user of the external device 300 may be the administrator of the display device 200, the entire screen of the display device 200 to be displayed on the external device 300 may include the defective area present in the display device 200, as illustrated in FIG. 6B.

In addition, the external device 300 may display information on a cabinet or a display module of the display device 200 where the defective area is generated, information on a cabinet or a display module required to be replaced, information of a cabinet or a display module targeted to be replaced, and the like.

For example, referring to FIG. 6B, the display screen of the external device 300 may display not only the entire screen of the display device 200, but also a message indicating to exchange a second module of a third cabinet and a fifth module of a third cabinet of the display device 200 and a message indicating to exchange a first module of a fourth cabinet and a sixth module of a fourth cabinet.

For this, the external device 300 may display position information of the cabinet or the display module of the display device 200. The external device 300 may display the position information by using the identification information of the cabinet or the display module.

In addition, the external device 300 may display different colors on the cabinets or the display modules to be replaced so that the user of the external device 300 may easily grasp the position of the cabinet or the display module necessary to be replaced.

However, this is merely an embodiment and information on a cabinet, not the information of the module necessary to be replaced, may be displayed. When the replacing is not performed in the display module unit but performed in the cabinet unit, the display screen of the external device 300 may display a message indicating to exchange the third cabinet of the display device 200 with the fourth cabinet or display the third cabinet and the fourth cabinet with colors different from each other.

Meanwhile, the electronic device 100 may communicate with a server.

Figure 7:
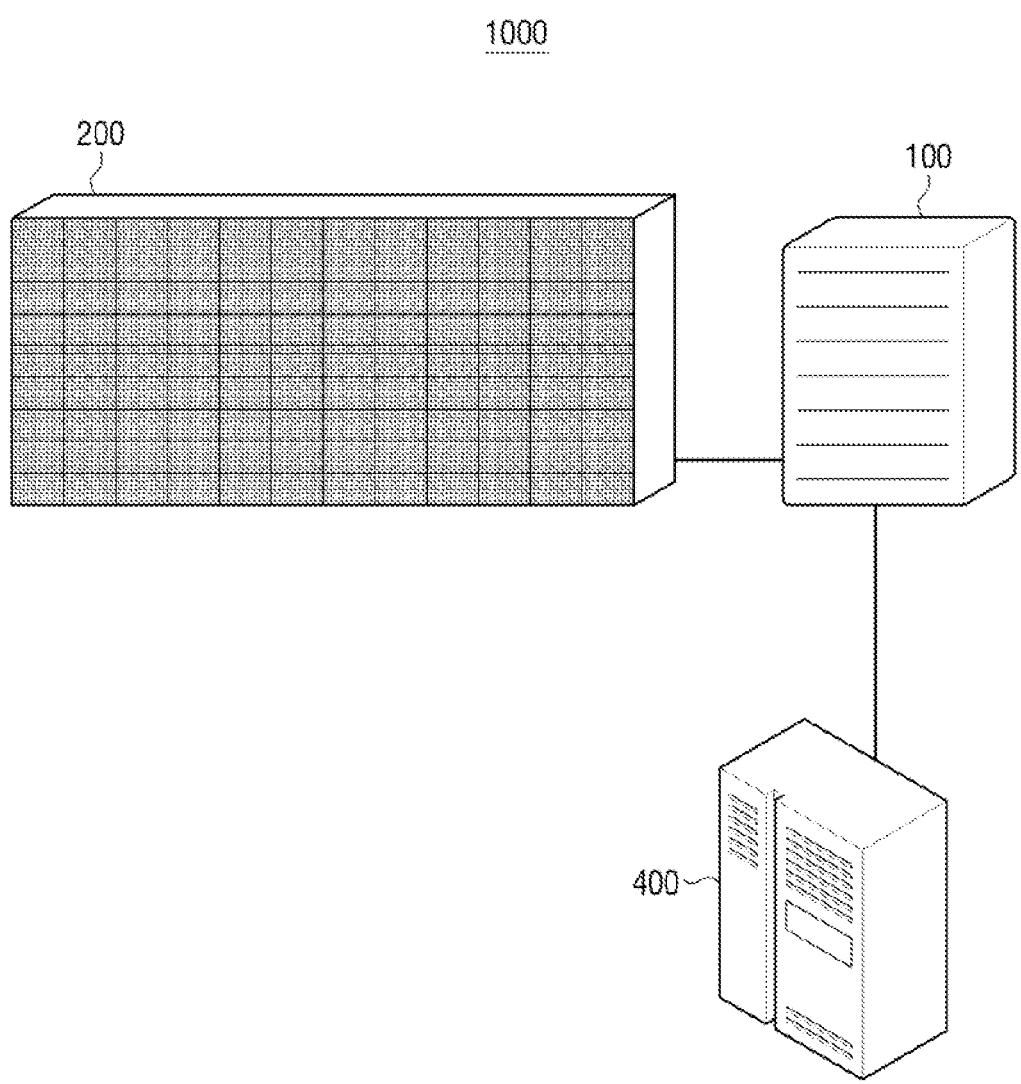
FIG. 7 is a diagram illustrating an electronic device according to an embodiment.

FIG. 7 is a diagram illustrating an electronic device according to an embodiment.

For convenience of description, the detailed description of the electronic device 100 and the display device 200 illustrated in FIG. 7 that is overlapped with the description in FIG. 1 will not be repeated.

Referring to FIG. 7, the electronic device 100 may communicate with the external device 400.

The electronic device 100 may receive position information of the defective pixel from at least one cabinet at every specific time and provide the received position information of the defective pixel and surrounding environment information of the plurality of cabinets measured at every specific time to the external device 400.

With regard to this, the electronic device 100 may receive the surrounding environment information of the plurality of cabinets from other external devices (not illustrated). Herein, the surrounding environment information of the plurality of cabinets may include a temperature, a humidity, and the like of a location where the plurality of cabinets included in the display device 200 are located, but there is no limitation thereto.

The electronic device 100 may transmit time information when the defective pixel is generated or time information when the defective pixel is detected among the information regarding the defective pixel to another external device (not illustrated), and the other external device (not illustrated) may receive surrounding environment information of the plurality of cabinets at the time when the defective pixel is generated by using the time information of the defective pixel.

If the time information regarding the defective pixel indicates 5:30 A.M., the electronic device 100 may request the other external device (not illustrated) the surrounding information at 5:30 A.M. and transmit the environment information such as the temperature, the humidity, and the like of the location where the plurality of cabinets are located at 5:30 A.M. to the electronic device 100.

The electronic device 100 may transmit the position information of the defective pixel and the surrounding environment information corresponding thereto to the external device 400.

Meanwhile, unlike as described above, the electronic device 100 may transmit the time information when the defective pixel is generated or the time information when the detective pixel is detected to the external device 400 and the external device 400 may receive the surrounding environment information of the plurality of cabinets at the time when the defective pixel is generated by using the received time information of the defective pixel. In other words, the external device 400, instead of the other external device (not illustrated), may receive the surrounding environment information of the plurality of cabinets at the time when the defective pixel is generated.

The external device 400 may digitize and store the received position information of the defective pixel and the surrounding environment information of the plurality of cabinets.

In addition, the external device 400 may identify a reason for generation of the defective pixel based on the stored surrounding environment information.

For this, the external device 400 may receive the position information of the defective pixel and the surrounding environment information of the plurality of cabinets of the display device 200 from the electronic device 100 at every specific period, and may identify the reason for the generation of the defective pixel of the display device 200 by using the information received periodically.

After identifying the reason for the generation of the defective pixel, when the plurality of cabinets are in the environment similar to the identified reason for the generation of the defective pixel, the external device 400 may transmit a message for the plurality of cabinets to the electronic device 100.

In other words, the external device 400 may identify the environment in which the defective pixel is highly likely to be generated and transmit a message regarding this to the electronic device 100.

In addition, the electronic device 100 may transmit the message received from the external device 400 to the display device 200 or the external device 300 that is a terminal device of the display device administrator.

Accordingly, the display device 200 may reduce the possibility of the generation of the defective pixel and maintain quality of the screen for a long period of time.

Meanwhile, the electronic device 100 and the external device 400 are illustrated in FIG. 7 as separate devices, but when the electronic device 100 performs the same function as the external device 400, the electronic device 100 and the external device 400 may be implemented as one device.

Figure 8:
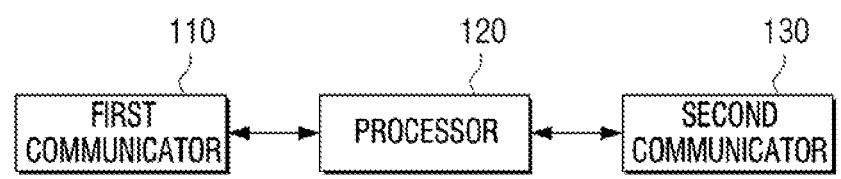
FIG. 8 is a block diagram of an electronic device 100 according to an embodiment.

FIG. 8 is a block diagram of an electronic device 100 according to an embodiment.

Referring to FIG. 8, the electronic device may include a first communicator 110, a processor 120, and a second communicator 130.

The first communicator 110 and the processor 120 are the same as the communicator 110 and the processor 120 in FIG. 3, respectively, and therefore the overlapped description thereof will not be repeated.

The processor 120 may provide the position information of the defective pixel and the surrounding environment information of the plurality of cabinets to the external device 400.

The processor 120 may receive the position information of the defective pixel at every specific period from the display device 200 and obtain the surrounding environment information of the cabinet from the other external device (not illustrated).

In addition, the processor 120 may receive a notification message related to the defective pixel from the external device 400 and transfer this to the display device 200. The notification message may include environment information where the defective pixel is highly likely to be generated and may be transferred to the electronic device 100, when it is determined that the possibility of the generation of the defective pixel is high.

In other words, the processor 120 may control general operations of the electronic device 100 so that the electronic device 100 communicate with the external device 400 or the other external device (not illustrated).

Meanwhile, the second communicator 130 may be an element for the electronic device 100 to communicate with the external device 400.

The second communicator 130 may transmit the position information of the defective pixel, the surrounding environment information of the plurality of cabinets, and the like to the external device 400 and receive the notification message from the external device 400.

In addition, the second communicator 130 may receive the surrounding environment information of the cabinet from the other external device 400.

In order to communicate with the external device 400, the second communicator 130 may include various communication modules such as a wired communication module (not illustrated), a near field wireless communication module (not illustrated), a wireless communication module (not illustrated), and the like.

Herein, the wired communication module may be a module for communicating with the external device 200 to 500 and a voice recognition server (not illustrated) according to the wired communication method such as wired Ethernet. The near field wireless communication module may be a module for communicating with the external device 200 to 500 located near according to the near field wireless communication method such as Bluetooth (BT), Bluetooth Low Energy (BLE), ZigBee, and the like. In addition, the wireless communication module may be a module connected to an external network according to wireless communication protocol such as Wi-Fi, IEEE, and the like to communicate with the external device 200 to 500 or a voice recognition server (not illustrated). Further, the wireless communication module may further include a mobile communication module connected to a mobile communication network according to various mobile communication standards such as 3rd generation (3G), 3rd generation partnership project (3GPP), long term evolution (LTE), LTE advanced (LTE-A), 5th generation network (5G networks) for communication.

Figure 9:
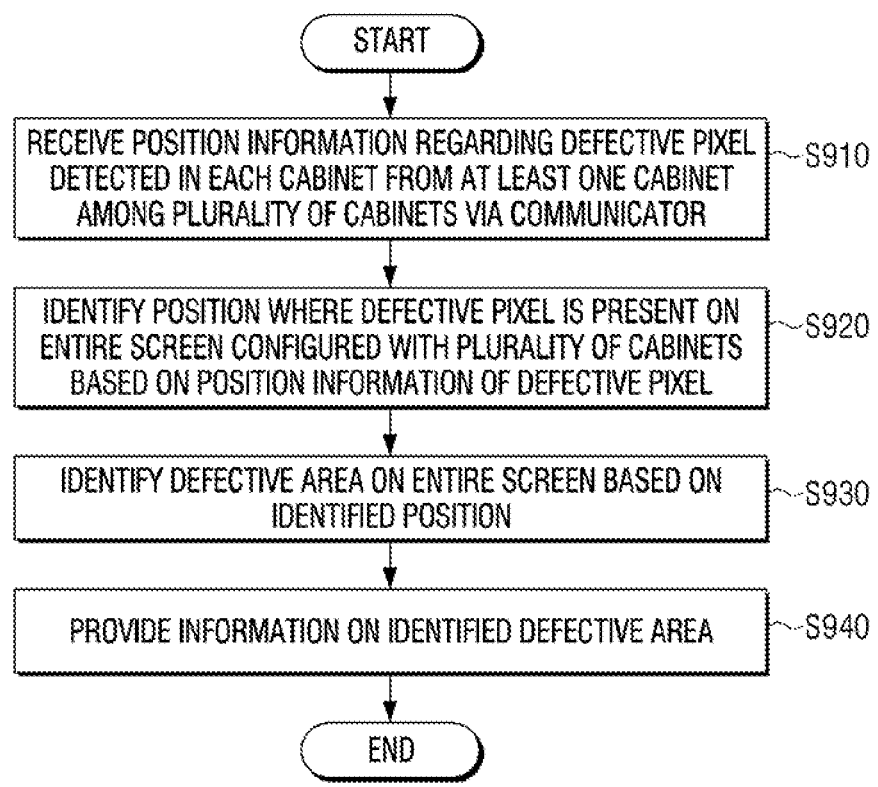
FIG. 9 is a flowchart illustrating a method for controlling an electronic device according to an embodiment.

FIG. 9 is a flowchart illustrating a method for controlling an electronic device according to an embodiment.

Firstly, the electronic device may receive the position information of the defective pixel detected in each cabinet from at least one cabinet of the plurality of cabinets (S910).

Herein, the position information of the defective pixel may be information including coordinate information of the position of the defective pixel among the plurality of pixels included in each cabinet.

Then, the position where the defective pixel is present on the entire screen configured with the plurality of cabinets may be identified based on the position information of the defective pixel (S920).

The coordinate information regarding the position where the defective pixel is present on the entire screen may be identified based on the coordinate information of the position of the defective pixel and the identification information of the at least one cabinet.

In addition, the defective area on the entire screen may be identified based on the identified position (S930).

When the predetermined number or more of other defective pixels are present within a predetermined distance from the specific defective pixel based on the identified position, an area including the specific defective pixel and the other defective pixels may be identified as the defective area.

The information on the identified defective area may be provided (S940).

The information on the identified defective area may be provided.

In addition, a cabinet including the plurality of defective pixels present in the identified defective area among the plurality of cabinets may be identified and the information on the defective area may be provided based on the identified cabinet.

Specifically, at least one cabinet required to be replaced with another cabinet among the cabinets including the defective area may be identified, and information on the identified cabinet and a cabinet targeted to be replaced with the identified cabinet among the plurality of cabinets constituting the entire screen may be provided.

Meanwhile, the embodiments described above may be implemented in a recording medium readable by a computer or a similar device using software, hardware, or a combination thereof. According to the implementation in terms of hardware, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units for executing other functions. In some cases, the embodiments described in the specification may be implemented as the processor 120 itself. According to the implementation in terms of software, the embodiments such as procedures and functions described in this specification may be implemented as separate software modules. Each of the software modules may perform one or more functions and operations described in this specification.

Computer instructions for executing processing operations according to the embodiments of the disclosure descried above may be stored in a non-transitory computer-readable medium. When the computer instructions stored in such a non-transitory computer-readable medium are executed by the processor, the computer instructions may enable a specific machine to execute the processing operations on the electronic device according to the embodiments described above.

The non-transitory computer-readable medium is not a medium storing data for a short period of time such as a register, a cache, or a memory, but may refer to a medium that semi-permanently stores data and is readable by a machine. Specific examples of the non-transitory computer-readable medium may include a CD, a DVD, a hard disk drive, a Blu-ray disc, a USB, a memory card, and a ROM.

While preferred embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

INDUSTRIAL APPLICABILITY

Not Applicable

SEQUENCE LIST FREE TEXT

Not Applicable

What is claimed is:

1. An electronic device comprising:
a communicator; and
a processor configured to:
receive, from a first cabinet of a plurality of cabinets, position information on a defective pixel detected in the first cabinet via the communicator, the position information comprising first coordinate values of a position of the defective pixel in the first cabinet with respect to a position of a first reference pixel among a plurality of pixels included in the first cabinet,
identify second coordinate values of a position where the defective pixel is present on an entire screen configured with the plurality of cabinets based on the first coordinate values of the position of the defective pixel in the first cabinet and identification information of the first cabinet,
wherein the identification information comprises position information of cabinets indicating connection relationship between the first cabinet and a second cabinet, the second coordinate values being determined in reference to a positional relationship of a second reference pixel in the second cabinet of the plurality of cabinets, and a relative positioning of the second cabinet in relation to the first cabinet based on the identification information,
identify a defective area on the entire screen based on the identified second coordinate values, and
provide information on the identified defective area,
wherein each of the plurality of cabinets comprises a plurality of display modules,
wherein each of the plurality of display modules comprises a plurality of pixels each configured with a plurality of LEDs, and
wherein the processor is configured to receive the position information of the defective pixel from the first cabinet at every specific time, and provide the received position information of the defective pixel to an external device.

2. The device according to claim 1, wherein the processor is configured to, based on a predetermined number or more of other defective pixels being present within a predetermined distance from a specific defective pixel based on the identified second coordinate values, identify an area including the specific defective pixel and the other defective pixels as the defective area.

3. The device according to claim 2, wherein the processor is configured to provide information on a position of the identified defective area.

4. The device according to claim 2, wherein the processor is configured to identify cabinets including a plurality of defective pixels present in the identified defective area among the plurality of cabinets, and provide information on the defective area based on the identified cabinets.

5. The device according to claim 4, wherein the processor is configured to provide information on positions of the plurality of cabinets including the defective area.

6. The device according to claim 4, wherein the processor is configured to identify the first cabinet required to be replaced with another cabinet among the plurality of cabinets including the defective area, and provide information on the identified cabinet and a cabinet targeted to be replaced with the identified cabinet among the plurality of cabinets constituting the entire screen.

7. A method for controlling an electronic device, the method comprising:
receiving, from a first cabinet of a plurality of cabinets, position information on a defective pixel detected in the first cabinet, the position information comprising first coordinate values of a position of the defective pixel in the first cabinet with respect to a first position of a reference pixel among a plurality of pixels included in the first cabinet;
identifying second coordinate values of a position where the defective pixel is present on an entire screen configured with the plurality of cabinets the first coordinate values of the position of the defective pixel in the first cabinet and identification information of the first cabinet,
wherein the identification information comprises position information of cabinets indicating connection relationship between the first cabinet and a second cabinet, the second coordinate values being determined in reference to a positional relationship of a second reference pixel in the second cabinet of the plurality of cabinets, and a relative positioning of the second cabinet in relation to the first cabinet based on the identification information,
identifying a defective area on the entire screen based on the identified second coordinate values; and
providing information on the identified defective area,
wherein each of the plurality of cabinets comprises a plurality of display modules, and
wherein each of the plurality of display modules comprises a plurality of pixels each configured with a plurality of LEDs,
wherein the receiving, from at least one cabinet of a plurality of cabinets, position information further comprises receiving the position information of the defective pixel from the first cabinet at every specific time, and
wherein the providing information on the identified defective area further comprises providing the received position information of the defective pixel to an external device.

8. The method according to claim 7, wherein the identifying the defective area on the entire screen comprises, based on a predetermined number or more of other defective pixels being present within a predetermined distance from a specific defective pixel based on the identified position, identifying an area including the specific defective pixel and the other defective pixels as the defective area.

9. The method according to claim 8, wherein the providing the information on the identified defective area comprises providing information on a position of the identified defective area.

10. The method according to claim 8, further comprising:
identifying cabinets including a plurality of defective pixels present in the identified defective area among the plurality of cabinets, and providing information on the defective area based on the identified cabinets.

* * * * *